Patented Dec. 12, 1950

2,533,816

UNITED STATES PATENT OFFICE 2,533,816

CYANINE DYESTUFF INTERMEDIATES

John David Kendall and Frank Peter Doyle, Ilford, England, assignors to Ilford Limited, Ilford, England, a British company No Drawing. Application June 3, 1948, Serial No. 30,977. In Great Britain June 4, 1947

10 Claims. (Cl. 260—240.5)

This invention relates to the production, from cyanine dyes, of compounds which serve as intermediates for the production of other cyanine dyes.

According to the present invention dyestuff intermediates are prepared by reacting a cyanine dye of the general Formula I:

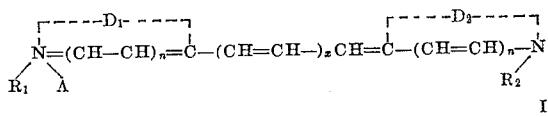

(this being one of the resonance extremes) wherein $R_1$ and $R_2$ are the same or different and are alkyl, hydroxyalkyl, aralkyl or hydroxyaralkyl groups, $D_1$ and $D_2$ are the same or different and are residues of five-membered or six-membered heterocyclic nitrogen rings, $n$ is nought or one, $x$ is 1 or 2, and A is an acid radicle, with an acid HX where X is the acid radicle and a trithio-orthoformate of the formula $HC(SR_3)_3$ where $R_3$ is an alkyl or aralkyl group, the reaction being effected in the presence of a carboxylic acid or anhydride which is a solvent for the reacting materials.

The product of the reaction is believed to be a compound of the general Formula II:

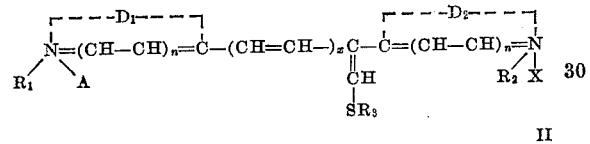

or the isomer in which the $=CH-SR_3$ grouping is attached to the carbon atom of the chain which is adjacent the ring of which $D_1$ is a residue. Normally only one isomer appears to be formed. Where $D_1$ and $D_2$ are the same, the isomers will be identical. The precise location of the quaternising groups in the final product is indeterminate; they may be $R_1A$ and $R_2X$ as shown or they may be $R_2A$ and $R_1X$. Moreover, the anion X may replace A if the RX salts are much less soluble. Where $R_1$ or $R_2$ contains an hydroxy group this may be acylated under the conditions of the reaction and to that extent the character of $R_1$ and $R_2$ may differ in the product from their character in the original compound.

The groups $R_1$ and $R_2$ are preferably lower alkyl or hydroxyalkyl groups, e. g. methyl, ethyl or propyl groups, or the corresponding hydroxyalkyl groups, e. g. β-hydroxyethyl.

Since in most cases where the product of this invention is used for further condensations, such condensations will result in the removal of the $SR_3$ group, the nature of $R_3$ is not of special importance. For the sake of convenience, however, it may be ethyl, in which case the reagent employed is triethyl trithio-orthoformate which is the most readily obtainable compound of the series. However, it is to be understood that it may be any other alkyl group or aralkyl group, e. g. tribenzyl trithio-orthoformate.

The acid HX may be any strong acid, but the hydrohalic acids, e. g. HCl and HBr, and p-toluene sulphonic acid are preferred. The solvent acid or anhydride is preferably a weak acid, e. g. acetic acid or acetic anhydride.

The reaction should be effected under substantially anhydrous conditions, i. e. in the absence of any hydrolytic substance, and is best effected by heating the reagents together.

The residues $D_1$ and $D_2$ may be selected from the residues of thiazoles, oxazoles, selenazoles and their polycyclic homologues, such as those of the benzene, naphthalene, acenaphthene and anthracene series, pyridine and its polycyclic homologues, such as quinoline and α and β naphthaquinolines, lepidines, indolenines, diazines, such as pyramidines and quinazolines, diazoles (e. g. thio-β,β'-diazole), oxaxolines, thiazolines and selenazolines. The polycyclic compounds of this series may also be substituted in the carbocyclic rings with one or more groups such as alkyl, aryl, amino, hydroxy, alkoxy and methylene-dioxy groups, or by halogen atoms.

The following examples, in which the parts are by weight, serve to illustrate the invention:

EXAMPLE 1

*Preparation of 1-ethylthio-2.4-di-α-quinolyl-1:3-butadiene diethiodide*

1.1' - diethyl - 2.2' - quinocarbocyanine iodide (4.8 parts), toluene-p-sulphonic acid (2.5 parts), triethyl trithio-orthoformate (2.2 parts) and acetic anhydride (25 parts) were refluxed until a bright yellow colour was present (about 5 minutes). The excess solvent was removed by evaporation in vacuo and the residue washed with ether, dissolved in ethyl alcohol and poured into aqueous potassium iodide solution. The orange-red solid which precipitated was filtered, washed with water and ethyl alcohol and crystallised from ethyl alcohol to give tiny orange-red needles. M. Pt. 176° (decomp.).

EXAMPLE 2

*Preparation of 1-ethylthio-2.4-dibenzthiazolyl-1:3-butadiene mono-ethiodide mono-etho-p-toluene sulphonate*

3.3'-diethyl thiacarbocyanine iodide (4.9 parts), toluene-p-sulphonic acid (2.5 parts), triethyl trithio-orthoformate (2.5 parts) and acetic anhydride (25 parts) were refluxed until a bright yellow-orange colour was present (5 minutes). The solution was then diluted with dry ether to precipitate an oil which, after repeated ether washing, gave a hygroscopic yellow solid, sufficiently pure for further reaction.

EXAMPLE 3

*Preparation of 1-ethylthio-2.4-dibenzthiazolyl-1:3-butadiene di-etho-p-toluene sulphonate*

This was prepared as in Example 2 but using 3.3' diethyl thiacarbocyanine-p-toluene sulphonate (5.4 parts). The product was an orange oil.

EXAMPLE 4

*Preparation of 1-methylthio-2.4-dibenzthiazolyl-1:3-butadiene di-etho-p-toluene sulphonate*

This was prepared as in Example 2 but using 3.3' diethyl thiacarbocyanine-p-toluene sulphonate (5.4 parts) and trimethyl trithio orthoformate (1.8 parts). The product was an oil.

EXAMPLE 5

*Preparation of 1-benzylthio-2.4-dibenzthiazolyl-1:3-butadiene-di-etho-p-toluene sulphonate*

This was prepared as in Example 4, the trimethyl trithio ortho-formate being replaced by tribenzyl trithio ortho-formate (4.0 parts). It was a thick orange oil.

EXAMPLE 6

*Preparation of 1-ethylthio-2.4-di-(5'methyl-2'-benzthiazolyl) 1:3-butadiene mono-etho-p-toluene sulphonate mono ethiodide*

This was isolated as oil by the reaction of 3.3'-diethyl-5.5'-dimethyl thicarbocyanine iodide (5.2 parts) as in Example 2.

EXAMPLE 7

*Preparation of 1-ethylthio-2.4-di-(5'-methyl-2'benzthiazolyl)-1:3-butadiene di-ethiodide*

The oil obtained in Example 6 was dissolved in alcohol and poured into aqueous potassium iodide solution. The brown crystalline solid formed was filtered and washed. It melted at 254° (decomposition) with previous darkening at 100° C.

EXAMPLE 8

*Preparation of 1-ethylthio-2.4-di(5'-chloro-2'-benzthiazolyl)-1:3-butadiene di-etho-p-toluene sulphonate*

This was prepared as a sticky solid by reaction of 3.3'diethyl-5.5'dichloro-thiacarbocyanine-p-toluene sulphonate (6 parts) as in Example 2.

EXAMPLE 9

*Preparation of 1-ethylthio-2.4-di(5'chloro-2'-benzthiazolyl)-1:3-butadiene di-ethiodide*

Treatment of the product from Example 8 with aqueous potassium iodide (as in Example 7) gave a brown solid which, after crystallisation from a mixture of acetic anhydride and acetic acid, gave russet-brown needles, M. Pt. 190° (with decomposition).

EXAMPLE 10

*Preparation of 1-ethylthio-2.4-di-(4'.5'-benzbenzthiazolyl)-1:3-butadiene dietho-p-toluene sulphonate*

This was prepared as an oil from 33'diethyl-4.5:4'.5'dibenzthiacarbocyanine p-toluene sulphonate (6.4 parts) as in Example 2.

EXAMPLE 11

*Preparation of 1-ethylthio-2.4-di-(4'.5'benzbenzthiazolyl)-1:3-butadien diethiodide*

Treatment of the product from Example 10 with aqueous potassium iodide (as in Example 7) gave brown crystals, M. Pt. 158° (with decomposition).

EXAMPLE 12

*Preparation of 1-benzylthio-2.4-di-(4'.5'-benzbenzthiazolyl)1:3-butadiene dietho-p-toluene sulphonate*

This was prepared initially as an oil by the reaction of tribenzyl trithio ortho-formate (4 parts) with 3.3'-diethyl-4.5:4'.5'dibenzthiacarbocyanine-p-toluene sulphonate (6.4 parts) as in Example 2. Treatment of the oil with acetone and ether gave a bright orange powder, M. Pt. 80° (decomposition).

EXAMPLE 13

*Preparation of 1-ethylthio-2.4-di-α-quinolyl-1:3-butadiene-diethobromide*

11' diethyl 22' carbocyanine bromide (4.8 parts) was reacted with triethyl trithio orthoformate (2.2 parts) and hydrobromic acid (1.0 part dissolved in a mixture of acetic acid and acetic anhydride 25 cc.) as in Example 2. The product was an oil.

EXAMPLE 14

*Preparation of 1-ethylthio-2.4-di-α-quinolyl-1:3-butadiene monoethobromide - mono - etho-2'-naphthalene sulphonate*

This was prepared as in Example 13 using naphthalene-2-sulphonic acid (2.5 parts) in place of the hydrobromic acid. The product was an oil.

The products of Examples 13 and 14 could be converted to the diethiodide of Example 1 by treatment with aqueous potassium iodide. The material obtained was identical with that of Example 1.

EXAMPLE 15

*Preparation of 1-ethylthio-2.4-di-γ-quinolyl-1:3-butadiene - mono-etho-bromide mono-etho-p-toluene sulphonate*

11' - diethyl - 4.4' - carbocyanine bromide (4.8 parts) was treated as in Example 2 to give the above compound as thick oil.

EXAMPLE 16

*Preparation of 1-ethylthio-2.4-di-γ-quinolyl-1:3-butadiene diethiodide*

The product obtained in the previous example was treated with aqueous potassium iodide solution as in Example 7 to give brown crystals which, after recrystallisation from ethyl alcohol, gave light-brown needles, M. Pt. 283° (with decomposition).

EXAMPLE 17

*Preparation of 1-ethylthio-2.4-dibenzselenazolyl-1:3-butadiene dietho-p-toluene sulphonate*

33'-diethyl-selenacarbocyanine-p-toluene sulphonate was treated as in Example 2 to give a thick brown oil.

EXAMPLE 18

*Preparation of 1-ethylthio-2.6-di-(3'.3'.dimethyl-indolenyl) 1:3:5.hexatriene mono methiodide mono metho-p-toluene sulphonate*

Bis-2-(133 trimethyl indolenine) pentamethine cyanine iodide (2.6 parts), toluene-p-sulphonic (1.1 parts) and triethyl trithio orthoformate (1.1 parts) were reacted in acetic anhydride (20 parts) as in Example 2. The product was a reactive brown tar.

EXAMPLE 19

*Preparation of 1-ethylthio-2.6-di(5'methyl 2'-benzthiazolyl) 1:3:5.hexatriene mono ethiodide mono etho-p-toluene sulphonate*

Bis 2-(3-ethyl-5-methyl-benzthiazole) pentamethine cyanine iodide (2.6 parts) were reacted as in Example 18 to give the intermediate as a thick orange tar.

EXAMPLE 20

*Preparation of 1-ethylthio - 2.6 - di(5'chloro-2'-benzthiazolyl) 1:3:5.hexatriene mono ethiodide mono etho-p-toluene sulphonate*

Bis - (3 - ethyl-5-chloro - benzthiazole) pentamethine cyanine iodide (3.1 parts) were reacted as in Example 18 to give the intermediate as a thick orange tar.

EXAMPLE 21

*Preparation of 1-ethylthio-2.4-dibenzthiazolyl-1:3-butadiene dietho-p-toluene sulphonate*

The process of Example 3 was repeated using propionic anhydride (25 parts) instead of acetic anhydride, and the same product was obtained.

The compounds produced according to this invention are valuable intermediates in the preparation of trinuclear polymethine dyes, for example by the processes of co-pending application No. 30,978, filed on even date herewith, now Patent 2,518,478, August 15, 1950.

What we claim is:

1. Process for the production of dyestuff intermediates which comprises reacting a substantially pure cyanine dye of the general formula:

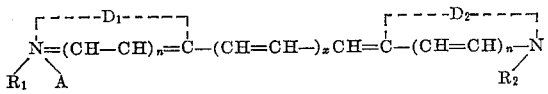

where $R_1$ and $R_2$ are each selected from the group consisting of alkyl, hydroxyalkyl, aralkyl and hydroxyaralkyl groups, $D_1$ and $D_2$ are each selected from the group consisting of five-membered and six-membered heterocyclic nitrogen rings, $n$ is selected from nought and one, $x$ is selected from one and two and A is an acid radicle, with a strong acid HX wherein X is the acid radicle and a trithio orthoformate of the formula $HC(SR_3)_3$ where $R_3$ is selected from the class consisting of alkyl and aralkyl groups, the reaction being effected by mixing the said cyanine dye with the said acid and said trithio orthoformate in the presence of a condensing agent selected from the group consisting of carboxylic acids and anhydrides, said condensing agent being a solvent for the reacting materials, and separating from the reaction mixture a compound of the general formula:

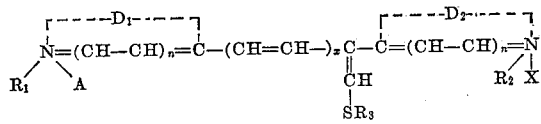

wherein the various radicals have the above significance.

2. Process for the production of dyestuff intermediates which comprises reacting a substantially pure cyanine dye of the general formula:

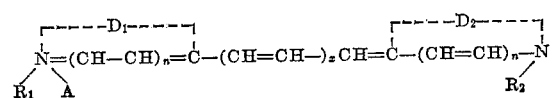

where $R_1$ and $R_2$ are each selected from the group consisting of alkyl, hydroxyalkyl, aralkyl and hydroxyaralkyl groups, $D_1$ and $D_2$ are each selected from the group consisting of five-membered and six-membered heterocyclic nitrogen rings, $n$ is selected from nought and one, $x$ is selected from one and two, and A is an acid radicle, with a hydrohalic acid and a trithio orthoformate of the formula $HC(SR_3)_3$ where $R_3$ is selected from the class consisting of alkyl and aralkyl groups, the reaction being effected by mixing the said cyanine dye with the said acid and said trithio orthoformate in the presence of a condensing agent selected from the group consisting of carboxylic acids and anhydrides, said condensing agent being a solvent for the reacting materials, and separating from the reaction mixture a compound of the general formula:

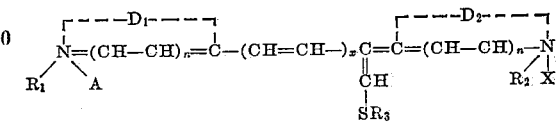

wherein the various radicals have the above significance.

3. Process for the production of dyestuff intermediates which comprises reacting a substantially pure cyanine dye of the gneral formula:

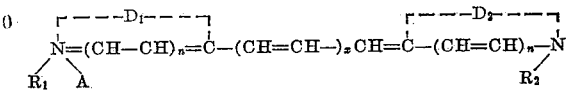

where $R_1$ and $R_2$ are each selected from the group consisting of alkyl, hydroxyalkyl, aralkyl and hydroxyaralkyl groups, $D_1$ and $R_2$ are each selected from the group consisting of five-membered and six-membered heterocyclic nitrogen rings, $n$ is selected from nought and one, $x$ is selected from one and two and A is an acid radicle, with a strong acid HX wherein X is the acid radicle and triethyl trithio orthoformate, the reaction being effected by mixing the said cyanine dye with the said acid and said trithio orthoformate in the presence of a condensing agent selected from the group consisting of carboxylic acids and anhydrides, said condensing agent being a solvent for the reacting materials, and separating from the reaction mixture a compound of the general formula:

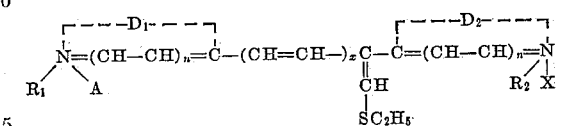

wherein the various radicals have the above significance.

4. Process for the production of dyestuff intermediates which comprises reacting a substantially pure cyanine dye of the general formula:

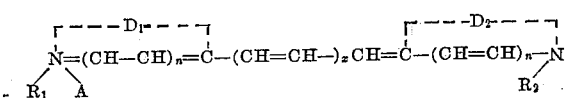

where $R_1$ and $R_2$ are each selected from the group consisting of alkyl, hydroxyalkyl, aralkyl and hydroxyaralkyl groups, $D_1$ and $R_2$ are each selected from the group consisting of five-membered and six-membered heterocyclic nitrogen rings, $n$ is selected from nought and one, $x$ is selected from one and two, and A is an acid radicle, with a strong acid HX wherein X is the acid radicle and a trithio ortho-formate of the formula $HC(SR_3)_3$ where $R_3$ is selected from the class consisting of alkyl and aralkyl groups, the reaction being effected by mixing the said cyanine dye with the said acid and said trithio orthoformate in the presence of acetic anhydride, and separating from the reaction mixture a compound of the general formula:

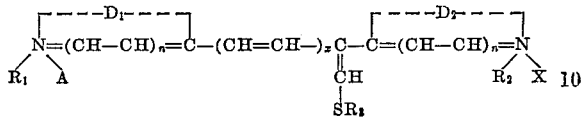

wherein the various radicals have the above significance.

5. A compound of the general formula:

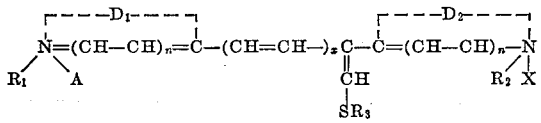

where $R_1$ and $R_2$ are each selected from the group consisting of alkyl, hydroxyalkyl, aralkyl, and hydroxyaralkyl groups, $D_1$ and $D_2$ are each selected from the group consisting of five-membered and six-membered heterocyclic nitrogen rings, $n$ is selected from nought and one, $x$ is selected from one and two, A and X are acid radicles and $R_3$ is selected from the group consisting of alkyl and aralkyl groups.

6. A compound of the general formula:

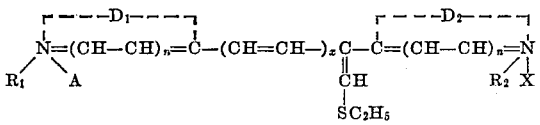

where $R_1$ and $R_2$ are selected from the group consisting of alkyl, hydroxyalkyl, aralkyl, and hydroxyaralkyl groups, $D_1$ and $D_2$ are each selected from the group consisting of five-membered and six-membered heterocyclic nitrogen rings, $n$ is selected from nought and one, $x$ is selected from one and two, and A and X are acid radicles.

7. A compound of the general formula:

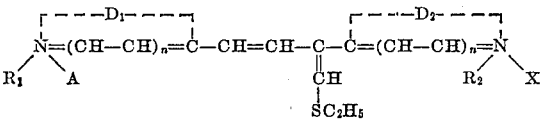

where $R_1$ and $R_2$ are each selected from the group consisting of alkyl, hydroxyalkyl, aralkyl, and hydroxyaralkyl groups, $D_1$ and $D_2$ are each selected from the group consisting of five-membered and six-membered heterocyclic nitrogen rings, $n$ is selected from nought and one, and A and X are acid radicles.

8. Process for the production of dyestuff intermediates which comprises reacting a cyanine dye of the general formula:

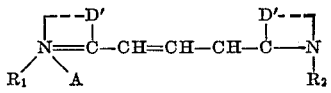

where D' constitutes the atoms necessary to complete a quinoline ring, $R_1$ and $R_2$ are alkyl radicals and A is an acid radical, with hydrochloric acid and a trithio orthoformate of the formula HC(S alkyl)$_3$, the reaction being effected in the presence of acetic anhydride, and separating from the reaction mixture a compound of the general formula:

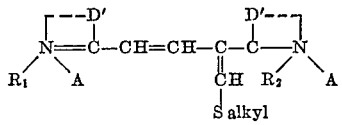

wherein the radicals have the above significance.

9. Process for the production of dyestuff intermediates which comprises reacting a cyanine dye of the general formula:

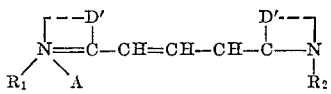

where D' constitutes the atoms necessary to complete a quinoline ring, $R_1$ and $R_2$ are alkyl radicals and A is an acid radical, with hydrochloric acid and triethyl trithio orthoformate of the formula HC(SC$_2$H$_5$)$_3$, the reaction being effected in the presence of acetic anhydride, and separating from the reaction mixture a compound of the general formula:

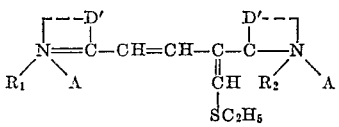

wherein the radicals have the above significance.

10. Process for the production of dyestuff intermediates which comprises reacting a cyanine dye of the general formula:

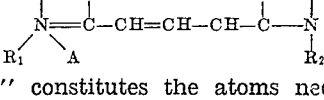

where D'' constitutes the atoms necessary to complete a benzthiazole ring, $R_1$ and $R_2$ are alkyl radicals and A is an acid radical, with hydrochloric acid and a trithio orthoformate of the formula HC(S alkyl)$_3$, the reaction being effected in the presence of acetic anhydride, and separating from the reaction mixture a compound of the general formula:

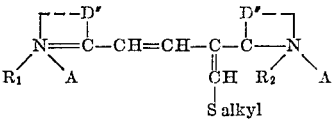

wherein the radicals have the above significance.

JOHN DAVID KENDALL.
FRANK PETER DOYLE.

REFERENCES CITED

The following references are of record in the file of this patent:

Kimura, Imperial Acad. of Jap. (1937–1938), pp. 261–265.

Certificate of Correction

Patent No. 2,533,816                                            December 12, 1950

JOHN DAVID KENDALL ET AL.

It is hereby certified that error appears in the printed specification of the above numbered patent requiring correction as follows:

Column 6, lines 36 and 68, for "$R_2$" read $D_2$; column 7, line 36, after the word "are" insert *each*;

and that the said Letters Patent should be read as corrected above, so that the same may conform to the record of the case in the Patent Office.

Signed and sealed this 20th day of February, A. D. 1951.

[SEAL]

THOMAS F. MURPHY,
*Assistant Commissioner of Patents.*